US008917698B2

(12) United States Patent
Lundin et al.

(10) Patent No.: US 8,917,698 B2
(45) Date of Patent: Dec. 23, 2014

(54) INTERSYSTEM CHANGE INVOLVING MAPPING BETWEEN DIFFERENT TYPES OF RADIO BEARERS

(75) Inventors: Niklas Lundin, Torslanda (SE); Hans Rönneke, Kungsbacka (SE); Gunnar Rydnell, V Frölunda (SE); Stefan Toth, Gothenburg (SE); Dirk Kopplin, Ytterby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1687 days.

(21) Appl. No.: 12/377,974

(22) PCT Filed: Aug. 18, 2006

(86) PCT No.: PCT/SE2006/000955
§ 371 (c)(1),
(2), (4) Date: Jun. 11, 2010

(87) PCT Pub. No.: WO2008/020788
PCT Pub. Date: Feb. 21, 2008

(65) Prior Publication Data
US 2010/0246533 A1    Sep. 30, 2010

(51) Int. Cl.
*H04W 4/00*     (2009.01)
*H04B 1/44*     (2006.01)
*H04J 3/16*     (2006.01)
*H04W 36/00*    (2009.01)
*H04W 72/00*    (2009.01)

(52) U.S. Cl.
CPC .............................. *H04W 36/0066* (2013.01)
USPC ........... 370/331; 370/282; 370/437; 455/436; 455/450

(58) Field of Classification Search
USPC ......... 370/278, 282, 328–329, 331–333, 466, 370/432.1, 436–439, 442, 450, 452.1–452.2
See application file for complete search history.

(56) References Cited

U.S. PATENT DOCUMENTS 7,433,929 B2 * 10/2008 Guilford et al. .............. 709/217
2003/0157935 A1 * 8/2003 Kauhanen ..................... 455/436
(Continued)

FOREIGN PATENT DOCUMENTS

EP    1058471 A2    12/2000
GB    2378090 A      1/2003
(Continued)

OTHER PUBLICATIONS

3GPP. 3rd Generation Partnership Project; Technical Specification Group Services and System Aspects; 3GPP System Architecture Evolution: Report on Technical Options and Conclusions (Release 7) 3GPP TR 23.882 V1.2.3 (Jun. 2006).

*Primary Examiner* — Redentor Pasia
(74) *Attorney, Agent, or Firm* — Roger S. Burleigh

(57) ABSTRACT

A packet data core network node and methods supporting packet data communication are disclosed. In one embodiment, a packet date core network node in a first core network comprises a first communication mechanism for control plane handling and mobility management, a second communication mechanism for user plane management and a mechanism for communication with a dual mode mobile terminal over a first radio network. The packet data core network node comprises or communicates with a mapping function for mapping between first radio bearers used in the first core and radio networks and second radio bearers of a type different from the type of the first radio bearers and used in a second core radio network at handover of a dual mode mobile terminal from the first core network to the second core network or vice versa. Another embodiment is a dual mode mobile terminal including such mapping function.

17 Claims, 10 Drawing Sheets

(56) References Cited

U.S. PATENT DOCUMENTS

2006/0002345 A1* 1/2006 Lapraye .................. 370/331
2006/0039326 A1* 2/2006 Jeong et al. ............. 370/329
2006/0291419 A1 12/2006 McConnell
2007/0213060 A1* 9/2007 Shaheen ................. 455/436
2008/0025263 A1* 1/2008 Pelkonen ................ 370/332

FOREIGN PATENT DOCUMENTS

| WO | WO 2004/034592 A2 | 4/2004 |
| WO | WO 2005/125256 A1 | 12/2005 |
| WO | WO 2006016786 A1 | 2/2006 |
| WO | WO 2006/048697 A1 | 5/2006 |

* cited by examiner

STATE OF THE ART

STATE OF THE ART

| LABEL | HIGH-LABEL CHARACTERISTICS | GBR/ NON-GBR | THB | R99 QoS | DSCP |
|---|---|---|---|---|---|
| L1 | HIGHEST PRIORITY | GBR | RT1 | CONVERSATIONAL | EF |
| L2 | HIGHEST PRIORITY | NON-GBR | NRT1 | CONVERSATIONAL | EF |
| L3 | REAL-TIME | GBR | RT2 | CONVERSATIONAL | EF |
| L4 | REAL-TIME | NON-GBR | RT3 | INTERACTIVE THP1 | AF4.1 |
| L5 | NON REAL-TIME HIGH PRIORITY | NON-GBR | NRT2 | STREAMING | AF3.1 |
| L6 | NON REAL-TIME | NON-GBR | NRT3 | INTERACTIVE THP2 | AF2.1 |
| L7 | NON REAL-TIME LOW PRIORITY | NON-GBR | NRT4 | INTERACTIVE THP3 | AF1.1 |
| L8 | BEST EFFORT | NON-GBR | BE | BACKGROUND | BE |

| TRAFFIC CLASS | TRAFFIC HANDLING PRIORITY | LABEL | HIGH LEVEL CHARACTERISTCS | DSCP |
|---|---|---|---|---|
| CONVERSATIONAL | N/A | L3/L1 | RT1 | EF |
| INTERACTIVE | 1 | L4 | NRT1 | AF4.1 |
| STREAMING | N/A | L5 | NRT2 | AF3.1 |
| INTERACTIVE | 2 | L6 | NRT3 | AF2.1 |
| INTERACTIVE | 3 | L7 | NRT4 | AF1.1 |
| BACKGROUND | N/A | L8 | BE | BE |

Fig. 11

INTERSYSTEM CHANGE INVOLVING MAPPING BETWEEN DIFFERENT TYPES OF RADIO BEARERS

FIELD OF THE INVENTION

The present invention relates mobility management and to intersystem changes, handovers, between different systems, for example between 2G/3G systems and so called SAE/LTE (System Architecture Evolution/Long Term Evolution) systems or generally between systems supporting packet switched communication only and systems that may support circuit as well as packet switched communication. Particularly the invention relates to a packet data core network node and to a mobile terminal of dual mode type and to a method for handling intersystem changes or handovers.

BACKGROUND

3GPP (Third Generation Partnership Project) is working on a next generation architecture for PS (Packet Switched) based services denoted SAE/LTE. A new architecture for mobile networks (SAE) is discussed as well as a new radio interface (LTE). The intention is to provide a simplified and more cost-effective architecture and that fewer nodes should be needed in the network. It is also an intention to provide more effective protocols and support for services having higher performance requirements. Other intentions are to provide less or lower delays and higher throughput. Preferably so called dual mode mobile terminals are to be used which are capable of implementing both SAE/LTE functionality and legacy 2G/3G PS functionality such that they can roam freely between new and old systems depending on which systems are more beneficial at the moment, for example from a radio point of view or due to other considerations. Such a functionality is called intersystem change, ISC. When roaming between SAE/LTE and 2G/3G it is a requirement that session continuity be maintained, such that the user will not have to restart any ongoing data sessions that are up and running because of the ISC. However, several issues are pending and problems still have to be solved.

Particularly there are problems with the requirements for ISC that urgently need to be solved. The architecture specified in SAE is different from the architecture of 2G/3G, the number of nodes in the different systems is not the same and in respective nodes of the systems also different functionalities reside. There may also be different protocols used for control signalling. Other differences between the systems are that there are different bearer concepts for SAE/LTE and 2G/3G. The methods for providing QoS on bearers such as QoS profiles and PDP contexts in 2G/3G differ from those in SAE/LTE which may use QCI:s (QoS Control Identifier) and DiffServ bytes. Furthermore, the bearers have to be initiated by the mobile terminal or the user equipment, UE, in 2G/3G whereas SAE/LTE at least also supports network controlled or network initiated bearers. So far there has been no solution as to how to convert from one bearer type to another at an ISC. One way to do it would be to provide for an optimized signalling between network and mobile terminal to establish bearers at every system change.

3GPP TR 23.882 v.1.2.3 among others discusses ISC for a dual mode mobile terminal (UE), i.e. change from 2G/3G access to SAE/LTE access or vice versa. If an UE attached to an SAE/LTE system decides to make an ISC to a 2G/3G system, e.g. since it has detected that the 2G/3G system provides for a better radio coverage, the UE sends a routing area update (RAU) message to the 2G/3G system, which is received in an SGSN (Serving GPRS Support Node). The SGSN, based on parameters included in the RAU message, concludes that the UE comes from SAE/LTE access. The SGSN then initiates signalling to establish connectivity to an ACGW (Access Control GateWay) that the UE was attached to in the SAE/LTE system. The ACGW is kept as an anchor point and provider of point of present to external PDN:s (Packet Data Networks). The ACGW sends UE specific information MM (Mobility Management) and PDP contexts towards the UE. Alternatively, if an UE is attached to the 2G/3G system and for example looses radio coverage, the UE can decide to make an ISC to an SAE/LTE system. The UE tries to get radio access using LTE and sends a RAU message to the SAE network, which is received by the ACGW. The ACGW, based on the parameters included in the RAU message, concludes that the UE comes from 2G/3G access. The ACGW then initiates signalling to the old SGSN where the UE was attached in order to get UE specific information (MM and bearer contexts). Such information can then be used in the ACGW to set up SAE/LTE specific contexts and bearers to the UE.

However, this requires specific, additional signalling and so far no satisfactory solution as to how to provide bearers at ISC as discussed above, particularly without requesting a lot of specific signalling.

SUMMARY

It is an object of the present invention to provide a solution to the problems associated with ISC:s or handovers between different systems, particulary between new so called packet-only networks and "old" or legacy 2G/3G systems. Particularly it is an object of the invention to suggest a packet data core network node which enables ISC:s from first core network access to second core network access and vice versa without producing any large amount of signalling and which instead minimizes the required amount of signalling for performing the ISC. It is also an object to suggest a node, or a concept which allows maintaining session continuity for end users.

A core network node is also needed through which frequent intersystem changes are supported. Moreover it is an object to provide a core network node allowing simple ISC between two different systems implementing different bearer concepts. Particularly a core network node is needed which enables ISC or handover irrespectively of whether it is network controlled (network initiated) or mobile terminal initiated. A core network node is also needed which enables fast and uncomplicated ISC:s and particularly which enables ISC:s while to the maximum extent keeping quality requirements when changing from one network to the other. It is also an object of the invention to provide a mobile terminal, a dual mode terminal, which in cooperation with a node as described above allows meeting one or more of the above mentioned objects as well as to provide a concept and a method of performing ISC:s or handovers between different systems, and particularly to in an easy, straightforward and efficient manner find the appropriate bearers when changing from access to one core network to another using another bearer technology.

Even more particularly a core network node, a mobile terminal and a method respectively is needed through which no special signalling will be required at ISC for updating bearer quality related characteristics.

A packet data core network node supporting packet data communication in a first core network is therefore suggested which comprises first communication means for control plane handling and mobility management and second communication means for user plane management. It further comprises means for communication with a dual mode mobile terminal over a first radio network. The packet data core network node further comprises a mapping function for mapping between first radio bearers implemented in the first core network and first radio network and second radio bearers used in the second core network and a second radio network such that a mapping from first to second bearers or vice versa can be done at an ISC or handover of the dual mode mobile terminal from first core (and radio) network access to second core (and radio) network access or vice versa. Particularly the first communication means are adapted to, at reception of a control message from a second core network node of a second core network requesting second bearers contexts, via or by means of the second communication means, activate the mapping means to map first bearers used in the first core and radio network to second bearers of the second core and radio network or vice versa using information on said mapping function, i.e. to activate the mapping function at a mobile terminal initiated intersystem change or handover.

Particularly the packet data core network node is adapted to, by means of the first communication means, provide information, e.g. in the form of second bearer identities in a response message relating to mapped bearers, e.g. if all requested bearers are successfully mapped onto (new) bearers according to the mapping table information and identities of the mapped (i.e. new) bearers.

Particularly the first communication means via or by means of the second communication means, are adapted to activate a mapping function for mapping first bearers used in the first core radio network to bearers of the second core radio network or vice versa for the purpose of performing a network initiated handover for intersystem change (ISC). Particularly the mapping function comprises a first repository for holding bearer mapping information for mapping of first bearers of the first core radio network to second bearers of the second core radio network, and a second repository holding bearer mapping information for mapping second bearers of a second core radio network onto first bearers of the first core radio network.

In a particular implementation the packet data core network node comprises a so called packet-only core network node only supporting communication of packet data. Most particularly it comprises a node in an envolved packet core (EPC), or more generally a packet data node adapted to operate in an SAE/LTE network. (It may alternatively comprise a WLAN core network node or a WiMAX core network node.) In one implementation the packet data core network node comprises a mobility management entity node, MME, separate from a user plane entity (UPE). If the packet data core network node comprises a combined MME/UPE, the first communication means comprise control plane handling means and mobility management handling means, but if it comprises a pure UPE node, the first communication means generally do not comprise a mobility management handling means (since they would be located in the node holding the MME functionality). In particular implementations, the mapping function means are arranged externally of, but in communication with, the packet data core network node, particularly in communication with said second communication means.

In an alternative embodiment the first packet data support node comprises a packet data support node of a first core network such as a 2G/3G network. Most particularly it comprises an SGSN, or a CGSN (Combined GPRS Support Node). In an advantageous implementation it is adapted to activate the mapping function at reception of a routing area update request message relating to an intersystem change from a mobile terminal. It may also be adapted to activate the mapping function at reception of a request message from a second core network node.

Generally this means that irrespectively of whether it is an ISC from a (second) core network node or to a second core network node, the mapping function may be provided either in the first core network node or in the second core network node. However, normally the most advantageous would be to implement a mapping function in a first core network node comprising for example an SAE/LTE node since then, for ISC:s to/from a 2G/3G network, it is still possible to keep the legacy SGSN:s or CGSN:s; packet data core network nodes in SAE/LTE still being under development.

Preferably, relevant to any one of the embodiments described above, the first and second repositories, i.e. the content therein, of the mapping function are predefined. Most particularly the first communication means may, in any one of the embodiments, be adapted to generate and send a message comprising information about traffic flow mapping onto bearers when a bearer is first activated, in case of MME or MME/UPE, or at later stage, e.g. at reception of a mobile terminal originating request for ISC or handover from a mobile terminal or at any stage therebetween. Particularly this means that an MME or an MME/UPE may be adapted to inform the mobile terminal about TFT (Traffic Flow Templates) in case a ISC is performed to 2G/3G. (Otherwise this will not be known if a bearer was initially setup in an SAE/LTE network.) Alternatively, also in case the packet data core network node is an MME or an MME/UPE or more generally an SAE/LTE node, the first communication means are adapted to generate a restriction message to a mobile terminal for restricting a mobile terminal from sending modify PDP context requests for bearers initially set up in a first core (SAE/LTE) network node. Still further an SAE/LTE node, for example MME or MME/UPE or an UPE may be adapted to send a dedicated message to a mobile terminal in 2G/3G to inform the mobile terminal about TFT (Traffic Flow Templates), flow mapping onto bearers, for an ISC to 2G/3G in order to enable the mobile terminal to send modify PDP context requests when connected to 2G/3G.

Generally, applicable to any one of the embodiments described above, the mapping function comprises mapping rules for mapping SAE labels onto 2G/3G QoS or traffic classes and vice versa. Particularly the first repository comprises mapping rules for mapping labels onto 2G/3G QoS or traffic classes and the second repository referred to above comprises rules for mapping 2G/3G traffic classes, for example conversational, interactive streaming, background, or QoS, onto labels. In advantageous implementations, the mapping rules are further adapted to additionally take one or more of the parameters traffic handling priority, high level characteristics, DSCP (DiffServ Code Point), guaranteed bitrate (GBR) into account.

According to the inventive concept a dual mode mobile terminal supporting communication by means of first terminal communication means over a first radio network with first packet data core network nodes and by means of second terminal communication means with second core (and radio) network nodes in a second core (and radio) network, said first and second core radio networks implementing different radio bearer concepts. The dual mode mobile terminal comprises a mapping function comprising mapping rules for mapping between first radio bearers used in the first core radio network communication and second radio bearers used for second core radio network communication.

Particularly the first and/or second communication means are adapted to activate the mapping function at initiation of an handover or a intersystem change from said first core network to said second core network or vice versa. Particularly the first and/or the second communication means are adapted to establish initiation of a network initiated handover from the first core network to the second core network and to activate a mapping function to perform such a mapping operation. Particularly the mapping function comprises a first repository holding information for mapping from first bearers to the second bearers and a second repository holding information for mapping from the second bearers to the first bearers.

Particularly the first and second mapping repositories comprise a first and a second mapping table respectively, the first mapping table comprising rules for mapping SAE/LTE labels onto 2G/3G QoS or traffic classes, and the second mapping table comprising rules for mapping 2G/3G traffic classes or QoS onto SAE/LTE labels.

Most particularly the mapping rules are predefined. They may be fixed or alterable according to different implementations. Particulary the mapping rules are adapted to additionally take one or more of parameters relating to the traffic handling priority, high level characteristics, DSCP, guaranteed bitrate or any other appropriate parameter into account. Of importance is, however, that the content of the mapping repositories provided in a mobile terminal always corresponds to the content in the packet data core network node as discussed above.

According to the invention a method for performing handover or intersystem change for dual mobile terminals supporting communication with first packet data core network nodes of a first core network implementing or using first radio bearers and with second core network nodes of a second core network using second radio bearers, wherein different bearer concepts or technologies are implemented for said first and second core networks (and corresponding first and second radio networks).

Particularly the method comprises the steps of; establishing, in a first or second core network node that a handover should be done from the first core network node to the second core network node or vice versa; activating a mapping function provided in the first or second core network node having made the establishment; performing a mapping of first bearers used or second bearers used in the network respectively from which the handover is to be done onto bearers used in the second or first core network to which the handover is to be done; identifying in a first or second core network node, to which a handover is to be done, which of the mapped bearers that are, or can be, activated; providing the core network node, from which a handover is (to be) done, and the mobile terminal about activated new bearers; completing the handover.

It should be clear that "first" and "second" may have a different interpretation from the one used when discussing the core network node when discussing the method steps. Alternatively the concepts "source", "target" could be used to indicate a node from which a handover is to be done and the node to which a handover is to be done Particularly the establishing step comprises; reception of a bearer request, for example a PDP context request, from a second core network node, for example an SGSN, in a first core network node, e.g. an EPC node handling control plane signalling such as an MME or an MME/UPE.

The establishing step may alternatively comprise; detection of initiation of a handover in a first core network node to a second core network node. The first core network node then has to be an EPC node, for example an MME or an MME/UPE or a node with a similar functionality since normally legacy 2G/3G core network nodes do not support network initiated handovers. Further the establishing step may comprise reception of a bearer request response, for example an SGSN context response from a second core network node or a first core network node relating to a handover from a second core network node to a first core network node, the second core network node comprising a 2G/3G core network node and the first core network node comprising a packet-only core network node, for example an SAE/LTE or an EPC node. Still further the establishing step may comprise reception of a bearer request from a first core network node, e.g an SGSN context request, in a second core network node comprising a 2G/3G node for handover from the first core network node to the second core network node. This means that the mapping function may reside either in a first core network node (e.g. for PS-only communication) or in a core network node (e.g. supporting circuit and packet switched communication) or a 2G/3G node, for ISC:s in either direction.

In a particular implementation the method comprises the steps of, for handover from the first core network node to the second core network node, particularly the first core network node comprises an SAE/LTE node using first bearers and the second core network node comprises a 2G/3G node using second bearers; mapping, in the mapping step, the first bearers onto the second bearers; providing a response message from the first core network node to the second core network node with information relating to active second bearers, for example NSAPI:s and possibly associated parameters, for example one or more of IMSI:s, PDP contexts, QoS:s, UPE address etc.; providing an updating response message from the second core network node to the mobile terminal including information about active bearers, for example containing information about active NSAPI:s.

Alternatively, the method comprises the steps of, for a handover from the second core network node using second bearers, e.g. comprising a 2G/3G node, to the first core network node using first bearers, for example comprising an SAE/LTE node; mapping, in the mapping step, the second bearers onto the first bearers and identifying the first bearers e.g. by AB-identities; providing a message to a first radio network node for example an eNB, containing information about active first bearers, for example AB-identities and associated parameters such as for example QCI:s, UL filters etc.; providing a routing area acceptance message to the mobile terminal comprising information about active bearer identities, for example active AB-identities.

The mapping step may particularly comprise; mapping network labels onto 2G/3G traffic classes, e.g. by taking one or more of high level characteristics, guaranteed bit rate (GBR), realtime/non-realtime priorities and DiffServ Code Point into account. Particularly, for handover from a 2G/3G core network to a SAE/LTE core network, mapping 2G/3G traffic classes onto first network, e.g. SAE/LTE labels, e.g. taking one or more of traffic handling priority, high level characteristics and DiffServ Code Point into account.

In a most particular embodiment the mapping function may be provided in mobile terminals and both in first ans second core network nodes, e.g. EPC nodes and SGSN:s meaning that it would be enough to transmit mapped bearer identities only also to "old" core network nodes, i.e. from which an ISC is done.

BRIEF DESCRIPTION OF THE DRAWINGS

The invention will in the following be further described, in a non-limiting manner, and with reference to the accompanying drawings, in which:

FIG. 10 illustrates a first repository of the mapping function according to an exemplifying embodiment of the present invention, FIG. 11 shows a second repository of the mapping function according to an embodiment of the present invention.

DETAILED DESCRIPTION

Figure 1:
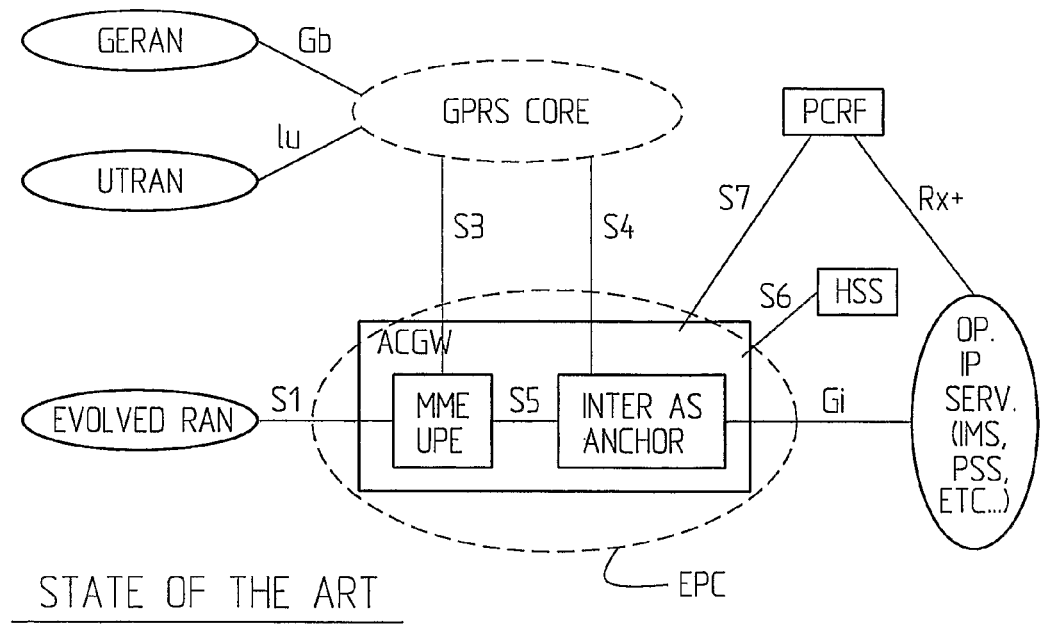
FIG. 1 schematically illustrates a network architecture comprising a GPRS core and an evolved packet core (EPC) enabling UE attachment over GERAN/UTRAN or evolved RAN.

FIG. 1 very schematically illustrates an architecture according to 3GPP TR 23.882 v0.11.0 of an SAE/LTE network comprising an evolved RAN (Radio Access Network), an evolved packet core EPC comprising, in this implementation, an ACGW (Access Control GateWay) node comprising MME/UPE (Mobility Management Entity/User Plane Entity) and an inter AS anchor function, a PCRF (Policy and Charging Rules Function), wherein packet data network (PDN) access is provided over a Gi interface. A GPRS core network to which radio access is provided through GERAN/UTRAN (GSM Radio Access Network/UMTS Radio Access Network) provides backwards compatibility for the SAE/LTE network over interfaces S3 and S4. A UE can be attached to the PLMN through the evolved RAN or through the UTRAN/GERAN. EPC communicates with HSS over an interface S6, with PCRF over an interface S7. An interface denoted S5 is provided between MME/UPE.

Figure 2:
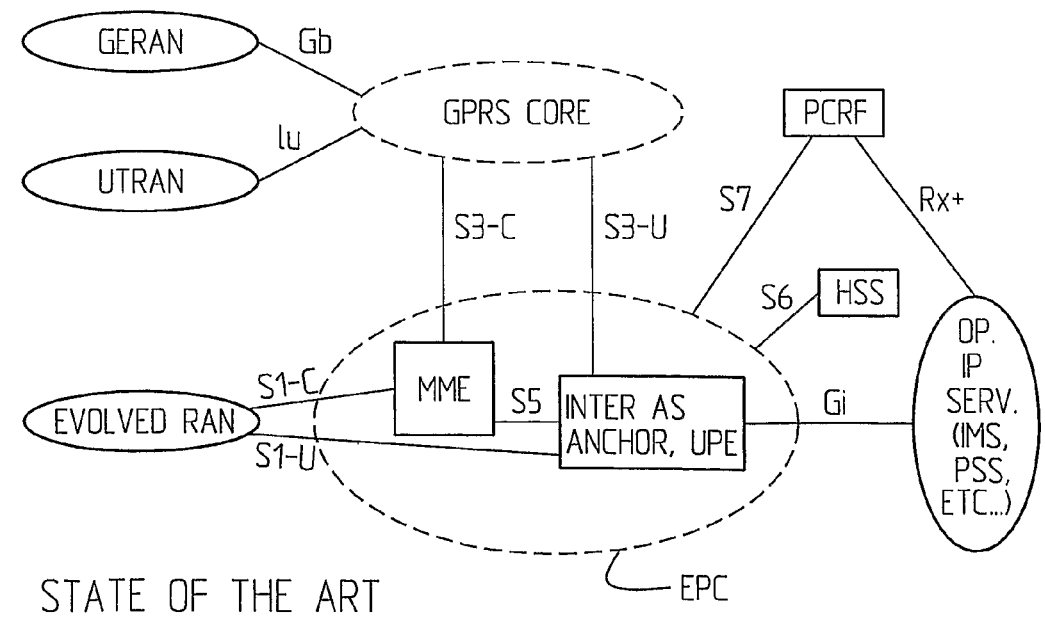
FIG. 2 shows an alternative architecture wherein the EPC is differently disposed.

FIG. 2 schematically illustrates an alternative architecture which is similar to that of FIG. 1 but with the difference that the UPE functionality is provided in the inter AS anchor instead or MME is broken out and implemented as a mobility management server, and UPE and IASA (InterAccess System Anchor) are implemented in one user plane/anchor node.

The UE has a mobility management (MM) context including a temporary ID (a P-TMSI or similar) and a radio attachment area, in SAE/LTE also called a tracking area (TA)(in 2G/3G called a routing area (RA)). The UE and the ACGW have a data context containing the IP address and APN (Access Point Name), a list of active QCI:s (QoS Control Identifiers), and bitrates, uplink/downlink filters (UL/DL) etc. The data context is called an UE bearer context which is here identified by an access bearer identity called AB-ID.

The AB-ID is used for updating the UL filter in the UE. An UE bearer context for each data bearer is established, corresponding to GPRS PDP contexts as: AB-ID (NSAPI for GPRS), active QCI (QoS for GPRS), UL filter for QCI, IP address and APN.

Bearers in SAE/LTE are called UE bearers and are characterized by UE bearer contexts. An UE bearer can have a specific QCI (for QoS handling) which can be realised through use of a DiffServ byte over the IP connections and by other means over the radio interface. It is not necessary to represent each "bearer" by a separate tunnel as it for example is done in 2G/3G which uses GTP (GSM Tunneling Protocol) over the IP connections, where each PDP context has its own TEID. A UE bearer is identified by an AB-ID in the ACGW, in eNB (Evolved Node B) and the UE (User Equipment).

Figure 3:
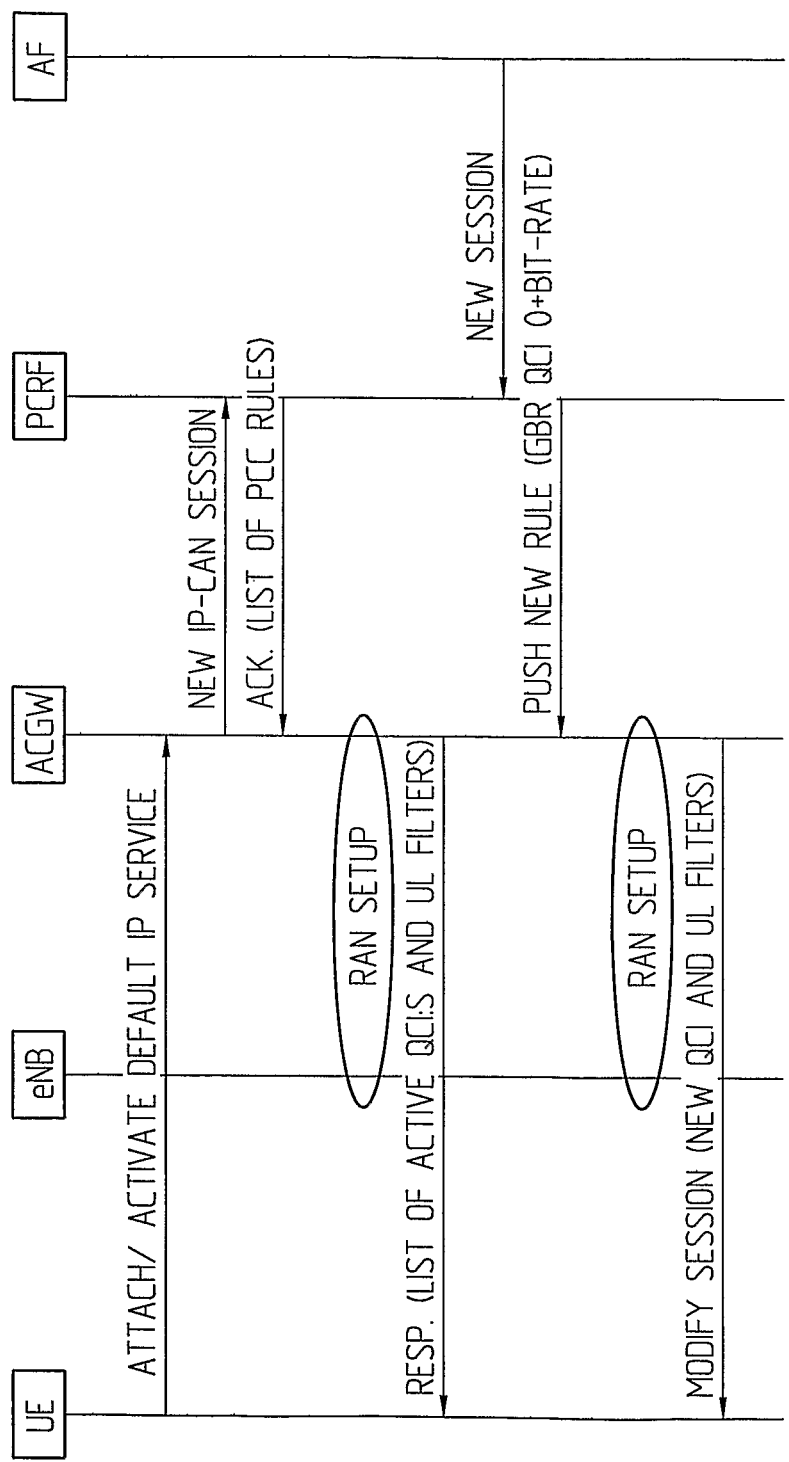
FIG. 3 is a state of the art figure illustrating, for purposes of background information, basic SAE signalling and a new AF session.

FIG. 3 also is a state of the art figure illustrating the basic SAE signalling and setup of a new AF session. It shows an Attache/Activate Default IP service message from UE to ACGW, which sends an IP-CAN session message to PCRF which acknowledges with a list of PCC rules. Then RAN setup procedures implemented are not further discussed herein, and ACGW sends a response comprising a list of active QCI:s and UL filters to the UE.

If a new session is to be initiated by AF, a new session message is sent from AF to PCRF which pushes a new rule (GBR (Guaranteed BitRate), QCI 0, bitrate) to ACGW, a RAN setup procedure is performed and ACGW sends a modified message with new QCI and UL filters to the UE.

Figure 4:
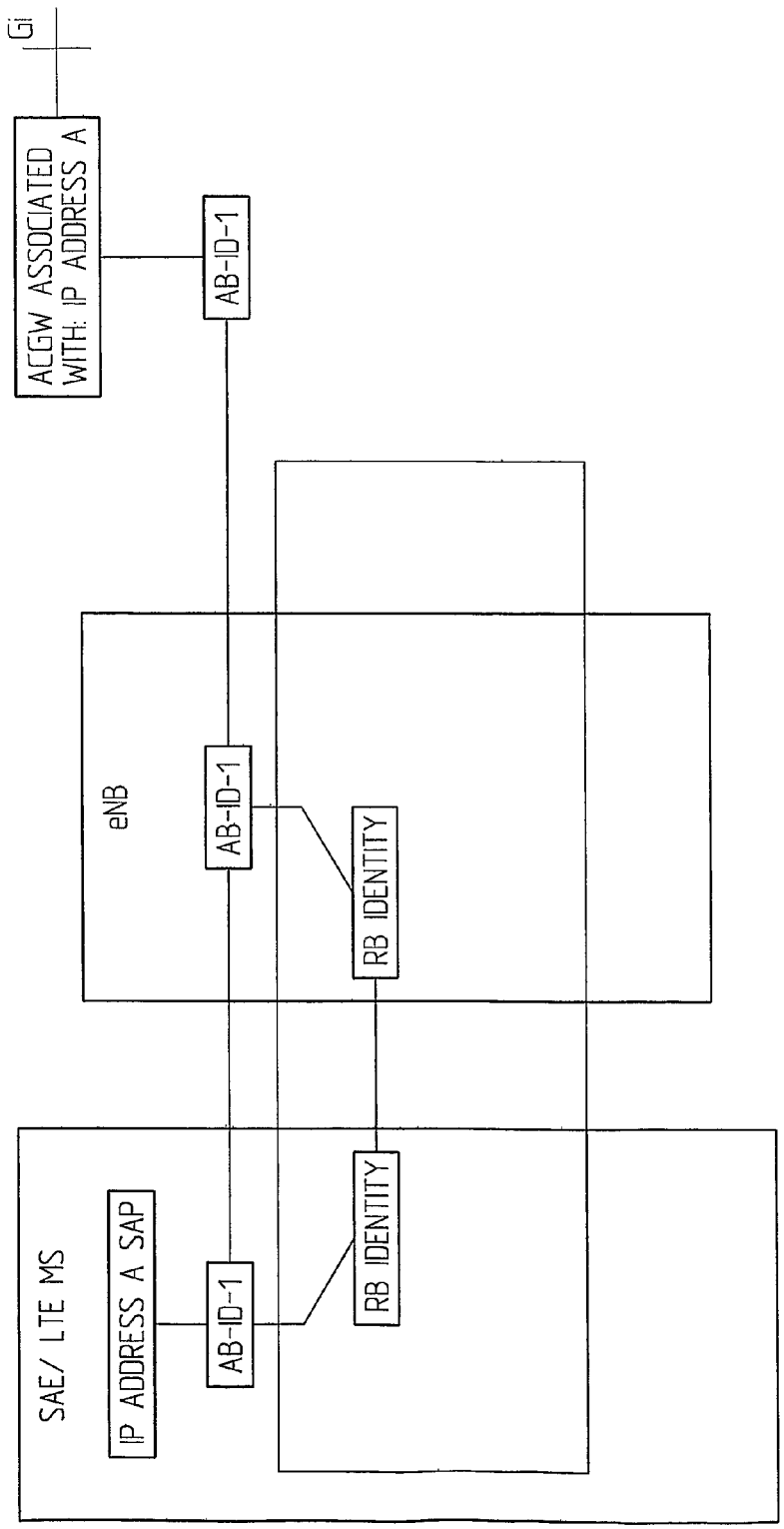
FIG. 4 is a figure illustrating a proposed use of bearer identities in SAE/LTE.

FIG. 4 is a block diagram with an SAE/LTE mobile terminal (MS), evolved node B (eNB) and an ACGW. FIG. 4 is merely included to illustrate the use of bearer identities in SAE/LTE.

Figure 5:
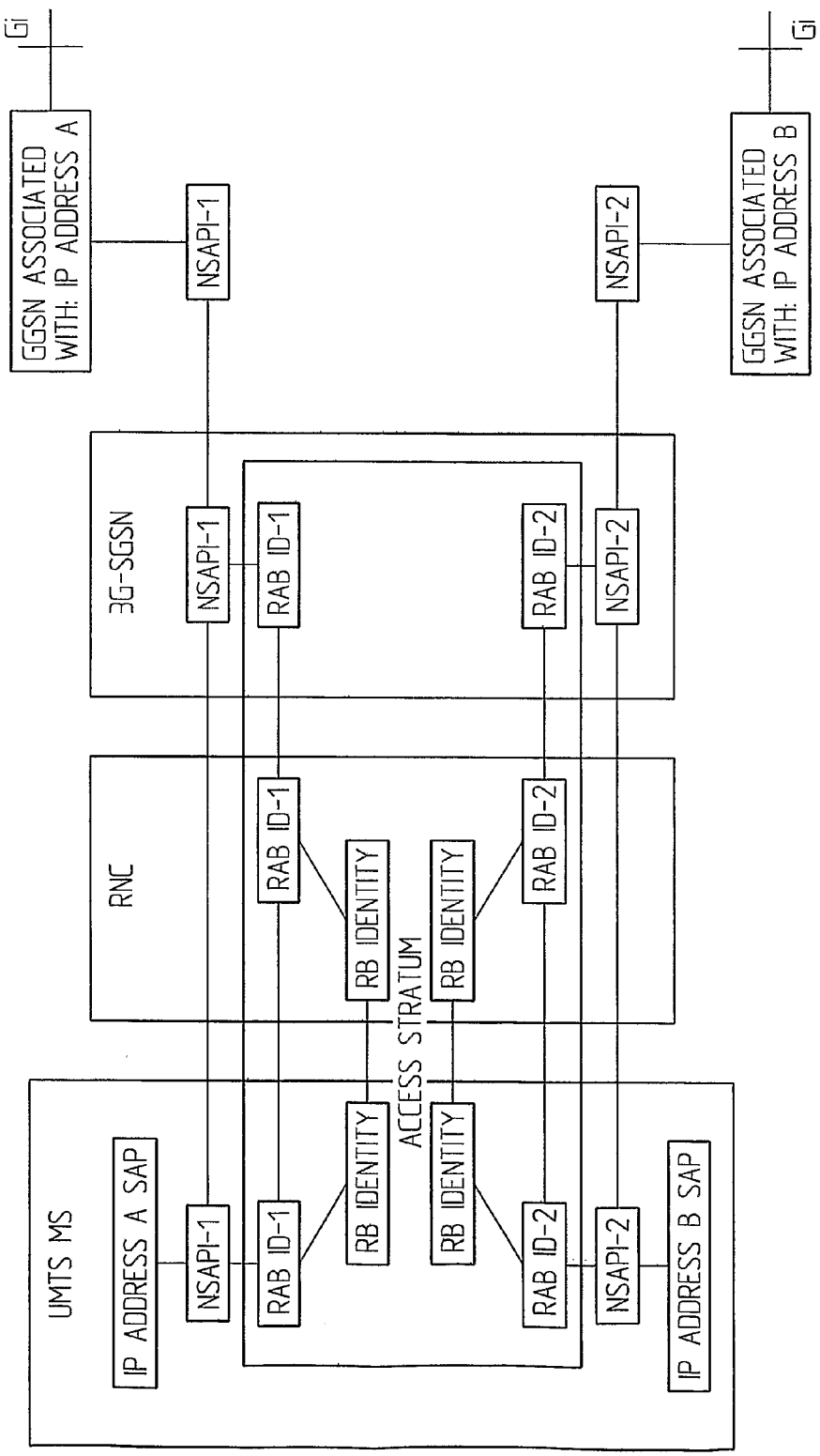
FIG. 5 is a state of the art figure illustrating use of bearer identities in a 3G system.

FIG. 5 illustrates the use of bearer identities in 3G which, as can be seen, is much more complicated. It will however not be further discussed herein since it relates to known technology.

In the following a procedure for performing an ISC from an SAE/LTE to a 2G/3G network will be briefly discussed. Similar procedures are applicable for an ISC from 2G/3G to SAE/LTE and also for an active mode handover between SAE/LTE and 2G/3G, which means a network initiated handover (not allowed from the 2G/3G side).

Figure 6:
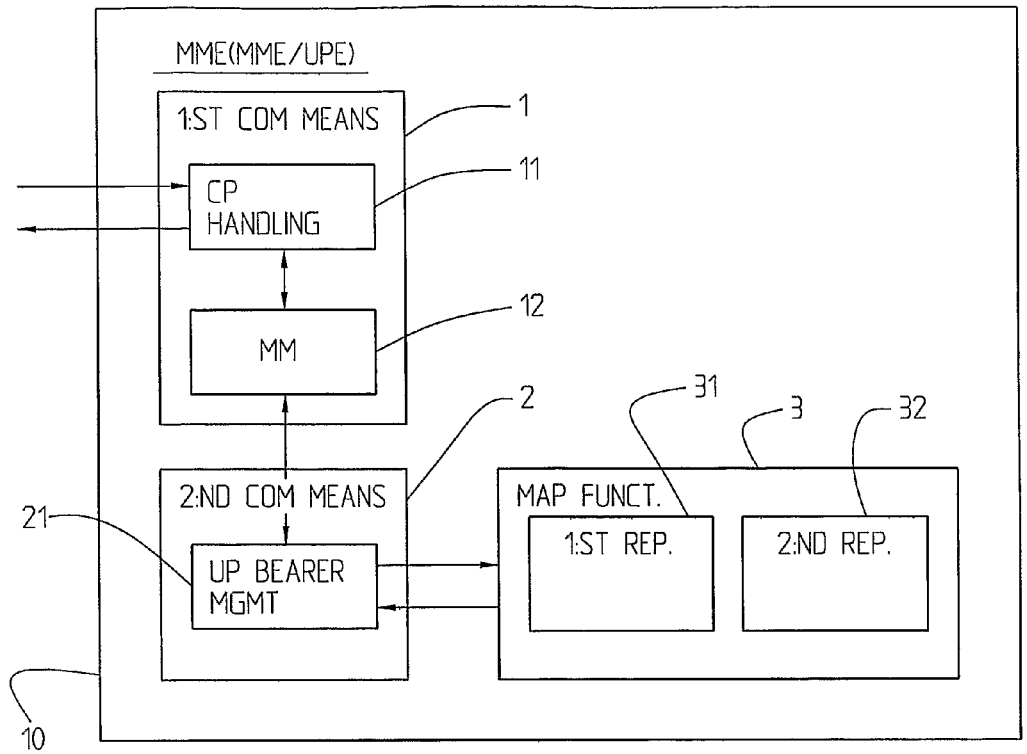
FIG. 6 is a block diagram describing a core network node in which the inventive concept is implemented according to a first embodiment.

FIG. 6 is a block diagram of a core network node in which the inventive concept is implemented according to a first embodiment. The core network node here comprises an MME or an MME/UPE 10. In addition to other standard functionality (not discussed or shown herein since FIG. 6 merely illustrates those means which are of importance for the inventive concept), MME 10 comprises first communication means 1, comprising (among others) control plane handling means 11 and mobility management means 12, and second communication means comprising (among others) user plane bearer management means 21. The user bearer management means 21 communicates with a mapping function 3 comprising a first repository 31 with information for handling mapping from for example first core network labels to second core network traffic classes, i.e. for mapping from SAE/LTE bearers to 2G/3G bearers and a second repository with information for mapping 2G/3G bearers to SAE/LTE bearers, e.g. from traffic classes to labels as will be exemplified with reference to FIG. 10.

It should be noted that SAE/LTE bearers are identified by means of AB-ID:s whereas 2G/3G bearers are identified by NSAPI:s (Network Service Access Point Identifier). At handover or ISC bearer identifications will thus be modified. It should be noted that there will never be more AB-ID:s than there are available NSAPI:s, since the number of NSAPI:s is more restricted.

Thus, if the CP handling means 11 receives a request indicating somehow that an ISC should be performed, (it may also be generated in the MME itself), CP handling means 11 sends information to the mobility management means 12 which in turn communicates with the user plane bearer management means 21, which activates the mapping function 3 wherein a mapping is performed. The actually activated bearers, or at least their identities, are provided to the CP handling means 11 which in turn provide information to a core network node of the (target) core network to which a handover is to be done.

Figure 7:
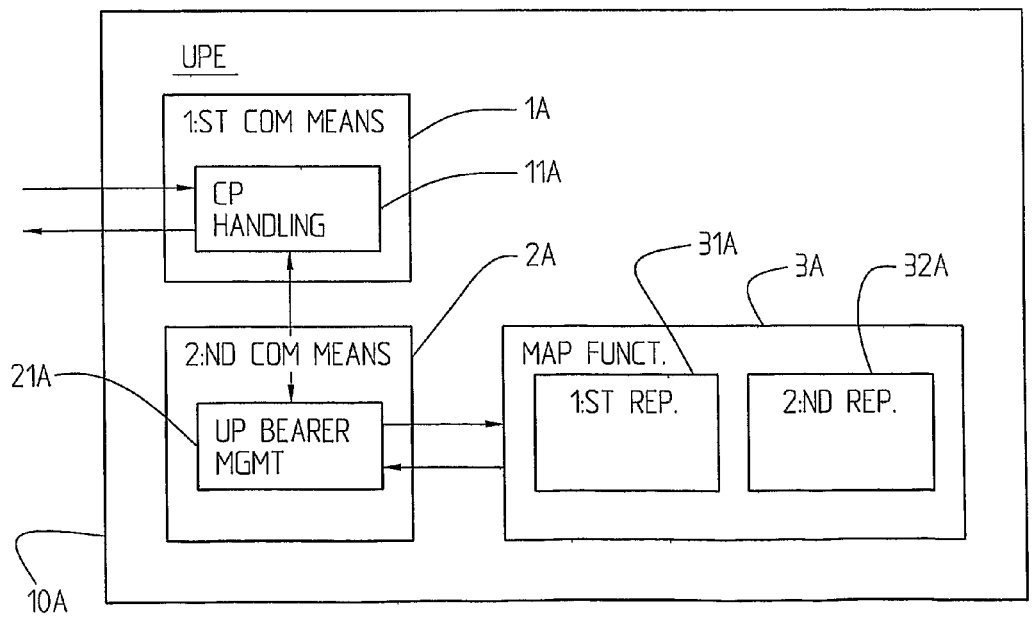
FIG. 7 is a block diagram of a core network node in which the inventive concept is implemented according to a second embodiment.

FIG. 7 is a block diagram of an embodiment in which the mapping function means 3A are implemented in an UPE node 10A, i.e. the MME functionality is provided in a separate node (not shown here). UPE 10A also comprises first communication means 1A with CP handling means 11A, but in this case mobility management means are may not included since they are provided for in the separately provided MME (not shown). UPE 10A also comprises second communication means 2A with UP bearer management means 21A and, as in the preceding embodiment, the mapping function 3A comprises a first repository 31A and a second repository 32A. In other aspects the functioning is the same as that described above. It should be clear that nodes 10, 10A support ISC from SAE/LTE to 2G/3G and vice versa. Normally handover or ISC:s are initiated by the UE (not shown) but SAE/LTE also supports network initiated handovers. Both functionalities are supported by the nodes described.

Figure 8:
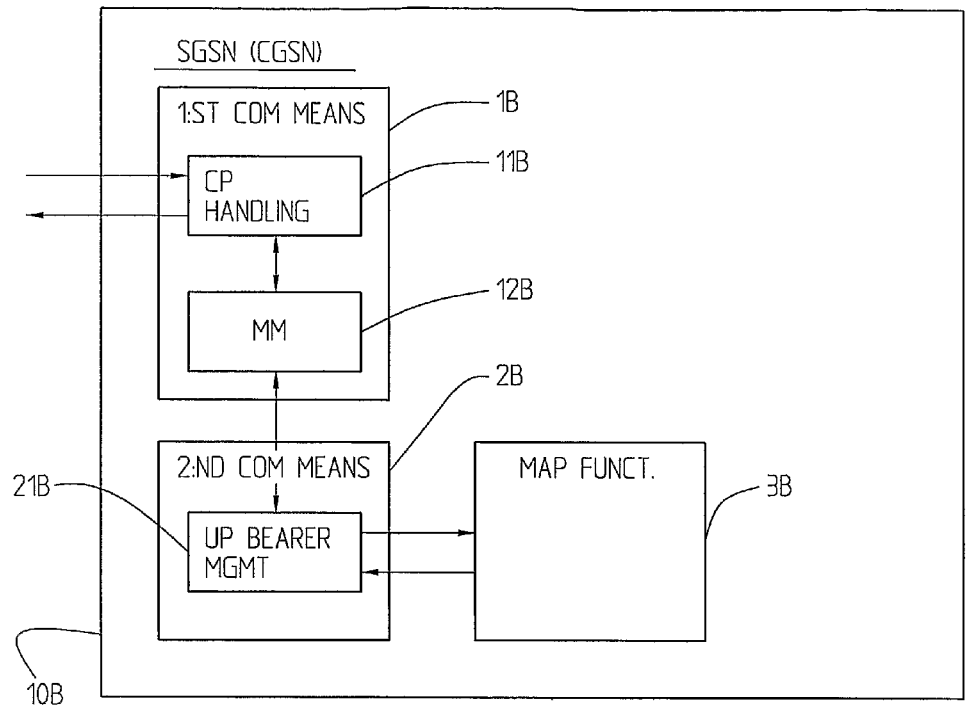
FIG. 8 is a block diagram illustrating a core network node in which the inventive concept is implemented according to a third embodiment.

FIG. 8 schematically illustrates a block diagram of another implementation in which the inventive functionality comprising a mapping function is provided in a 2G/3G node, particularly an SGSN or a CGSN. Normally this is less attractive since there already exist legacy SGSN:s/CGSN:s as opposed to MME:s/UPE:s etc. which are under elaboration, but still it is possible to, provide a functionality in an SGSN or CGSN instead (or additionally). Hence, SGSN 10B (similar to the nodes in the preceding embodiments) comprises first communication means 1B, with CP handling means 11B and mobility management means 12B, and second communication means 2B comprising UP bearer management means 21B, which communicate with, activate and receive information from a mapping function 3B. The mapping function 3B is here only illustrated as a mapping function but it should of course be clear that it normally also comprises a first and a second repository as described above which may be combined or implemented in any appropriate manner and eventually a separate mapping control function (applicable to every embodiment).

Figure 9:
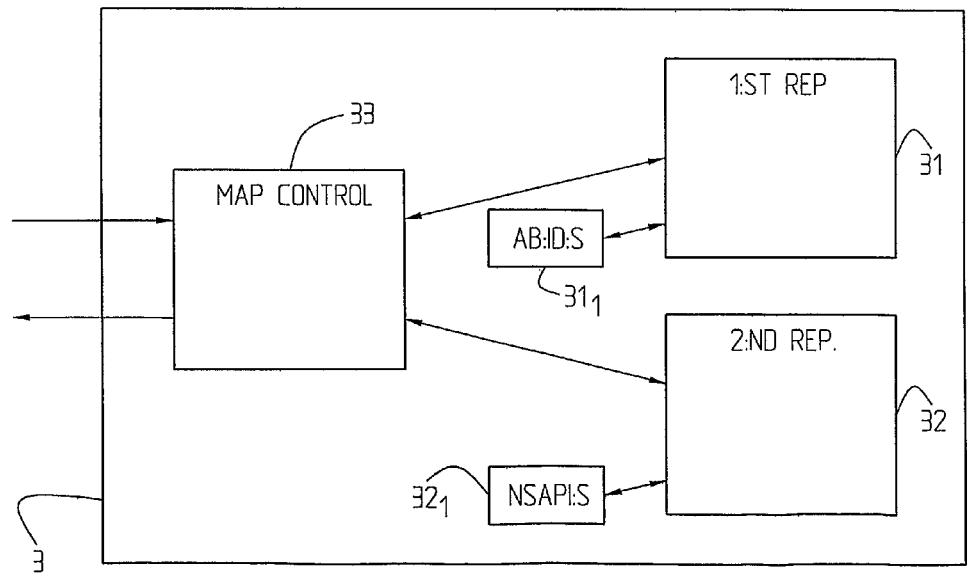
FIG. 9 is a block diagram describing an implementation of the mapping function according to the present invention.

FIG. 9 is a block diagram of an information repository 3 according to one implementation. As discussed above it comprises a first repository 31 and a second repository 32, which are controlled by control means 33, which upon receiving a message from the UP bearer management means establish if information is to be fetched from the first 31 or from the second repository 32. The first repository 31 here communicates with AB-ID identity holding means 31$_1$ which also may be seen as included in the repository itself and similarly the second repository communicates with ID holding means for holding NSAPI:s 32$_1$ although this information normally also might be held in the repository 32 itself. This can be implemented in different manners and it is also possible to provide for different options as far as the mapping is concerned and the mapping itself can of course be done in many different ways.

According to the invention the procedure among others has as an object to guarantee a predictable end-to-end behavior of packet flows. Generally it is applicable when mobile terminals move between 3GPP systems of different releases and when remapping of QoS is applicable. In R 99, i.e. 2G/3G, QoS is defined by a range of QoS parameters which meet the specifics in different parts of the 3GPP network (3GPP covers 2G/3G as well as SAE/LTE). Some parameters apply to the radio part whereas other parameters apply to the respective (core) network. The so called label approach has been suggested and it is advantageous in so far as it provides a common language for radio and core network QoS.

This means at the same time that when moving between 3GPP systems of different releases, remapping of QoS parameters is required. Due to differences in 2G/3G QoS and labels, a one-to-one mapping of QoS parameters is not possible. However, the end user perception should not suffer therefrom.

FIG. 10 shows one example, among many others, of a set of mapping rules between labels and 2G/3G (R99) QoS, i.e. it shows an example of a first repository. The table intends to map labels L1-L8 to R99 QoS, and factors are taken into account such as high level characteristics, GBR/non-GBR, i.e. Guaranteed Bit Rate/non-Guaranteed Bit Rate, THB (Traffic Handling Behaviour) concerning realtime traffic, non-realtime traffic with a given priority and DSCP, DiffServ Code Point in Internet (for QoS handling of IP packets). As can be seen label L1 with highest priority, guaranteed bitrate and realtime traffic priority one corresponds to traffic class conversational, but also label L2 with highest priority, non-GBR and non-realtime traffic, priority one, is mapped onto traffic class conversational as well as L3, realtime, GBR and realtime traffic priority 2. L4, L6 and L7 are mapped onto the interactive traffic class, whereas L5 is mapped onto traffic class streaming and L8, best effort, is mapped onto the background traffic class. (This just relates to one particular mapping proposal.) The individual bearer identities AB-ID:s (for SAE/LTE) are mapped onto NSAPI:s (identities for 2G/3G bearers).

Similarly FIG. 11 shows an example of a second repository 32 for traffic class to label mapping for ISC:s from 2G/3G to SAE/LTE. As can be seen traffic class conversational is mapped onto label L3 (or L1 in another implementation), interactive onto label L4, streaming onto label L5, interactive onto label L6 or label L7 depending on the traffic handling priority, wheras traffic class background is mapped onto label L8. Of course it would also be possible to map conversational traffic class onto L1 or L2, interactive onto label L2 or L3 or L4, background onto L7 etc. It may also be possible to provide for different options for example use two different set of tables, in which case however a UE would have to be informed about which actual table is to be used since the inventive concept is based on also the mobile terminal, or a UE, comprising a corresponding mapping function, containing a first and a second repository with the same content as the core network node, which has the effect that the control signalling can be reduced and the UE only has to be made avare of the identities of the actually activated bearers, other information it contains itself in the respective repository. It should be noted that some parameters become obselete at a mapping from SAE/LTE to 2G/3G, for example maximum SDU size, delivery of erroneous SDU:s (Service Data Unit), residual BER (Bit Error Rate) etc.

Figure 12:
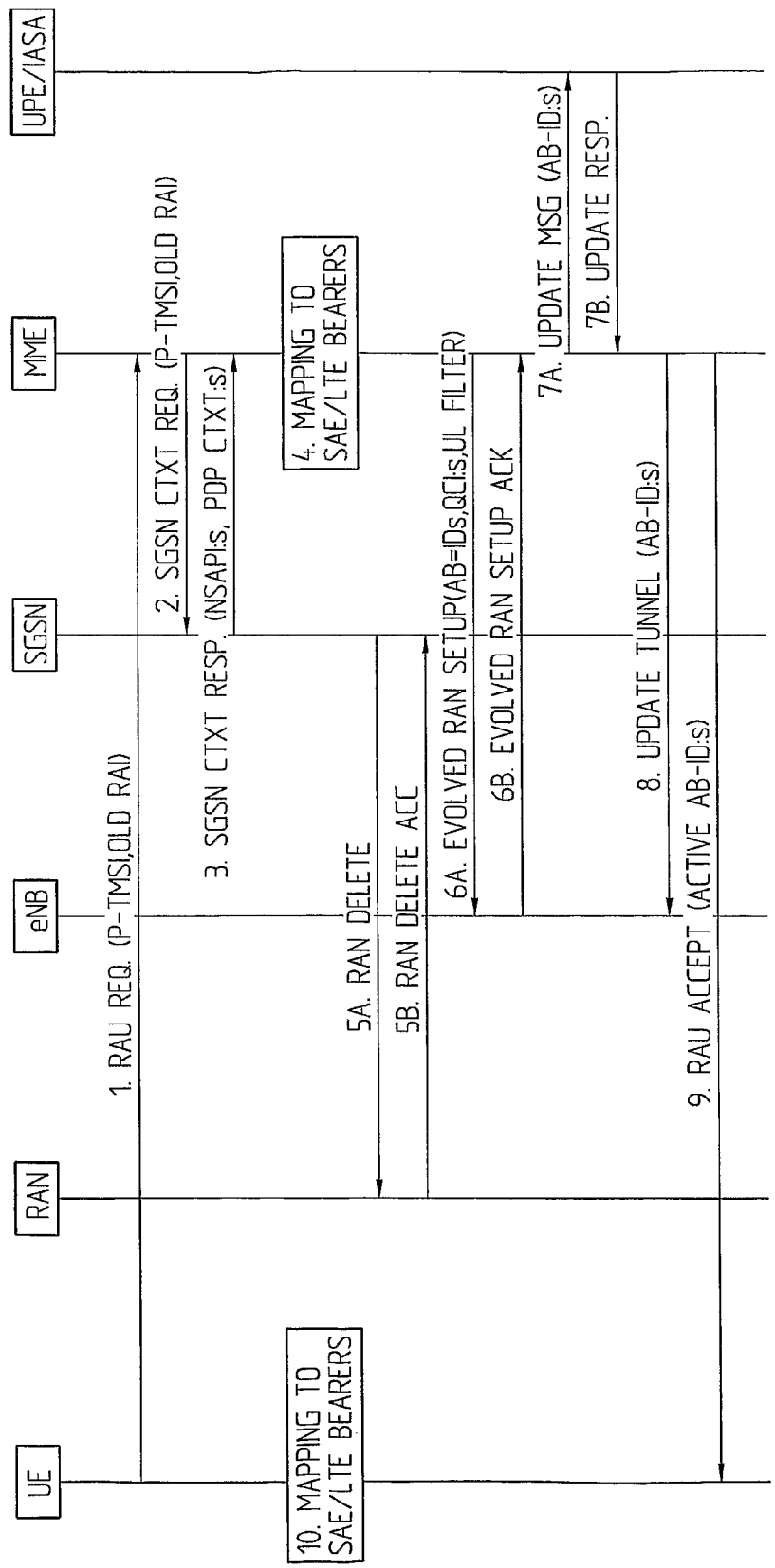
FIG. 12 is a sequence diagram illustrating an ISC from 2G/3G to SAE/LTE when a mapping function is allocated in MME and UE respectively.

FIG. 12 is a sequence diagram illustrating one example of a procedure for an ISC from a 2G/3G network to an SAE/LTE network with a split up architecture, i.e. MME is disposed separately with respect to UPE/IASA. Thus, it is supposed that the UE is attached to 2G/3G and for example discovers that it needs to do a handover to SAE/LTE, for example due to better radio coverage in the SAE/LTE system. UPE/IASA act as an anchor also for 2G/3G access. MME here comprises the mapping function as well as UE. Thus, an UE sends a routing area update (RAU) request to MME including P-TMSI and old RAI (Routing Area Identity), 1.

Using the P-TMSI and old RAI, MME is able to find the SGSN where the UE was attached in the old (2G/3G) system. MME sends an SGSN context request to inform the SGSN that the UE has moved out of the SGSN and to request the contexts for the UE, i.e. MM context and PDP contexts, 2. SGSN then sends an SGSN context response with PDP contexts etc. back to MME, 3. SGSN also sends a message to RAN instructing it to delete contexts, 5A, which (RAN) responds with a RAN delete acceptance message, 5B. Using the mapping function in MME, a mapping of PDP contexts, i.e. the bearers used in the 2G/3G network, is done to SAE/LTE bearers, providing the relevant AB-id:s of the SAE/LTE bearers, 4. MME then sends an evolved RAN setup message to evolved node B (eNB) comprising the AB-id:s, preferably also QCI:s, UL filters, 6A, whereupon eNB returns an evolved RAN setup acknowledgement, 6B. MME also sends an update bearer request with AB-ID:s of GTP or similar to UPE/IASA, 7A, (or a PDP content request with TEID:s if GTP or a similar protocol is used for the S5 interface in SAE/LTE—the inventive concept is applicable irrespectively of which protocol is implemented), which returns an update response message, 7B. MME then sends an update tunnel message to eNB to indicate the AB-ID:s (or TEID:s) that the eNB shall use for a user plane tunnel to the UPE/IASA, 8, and MME also sends a RAU accept message to the UE indicating the network bearers that are active, by means of AB-ID:s and possibly QCI:s, 9. Thus information is provided to UE about the respective AB-ID:s.

Since the UE has already done (or does) an internal mapping to the SAE/LTE network context (using its own mapping function), the UE can use the list of AB-ID:s received to know which contexts that should be activated; other PDP contexts may be locally deleted, 10.

Figure 13:
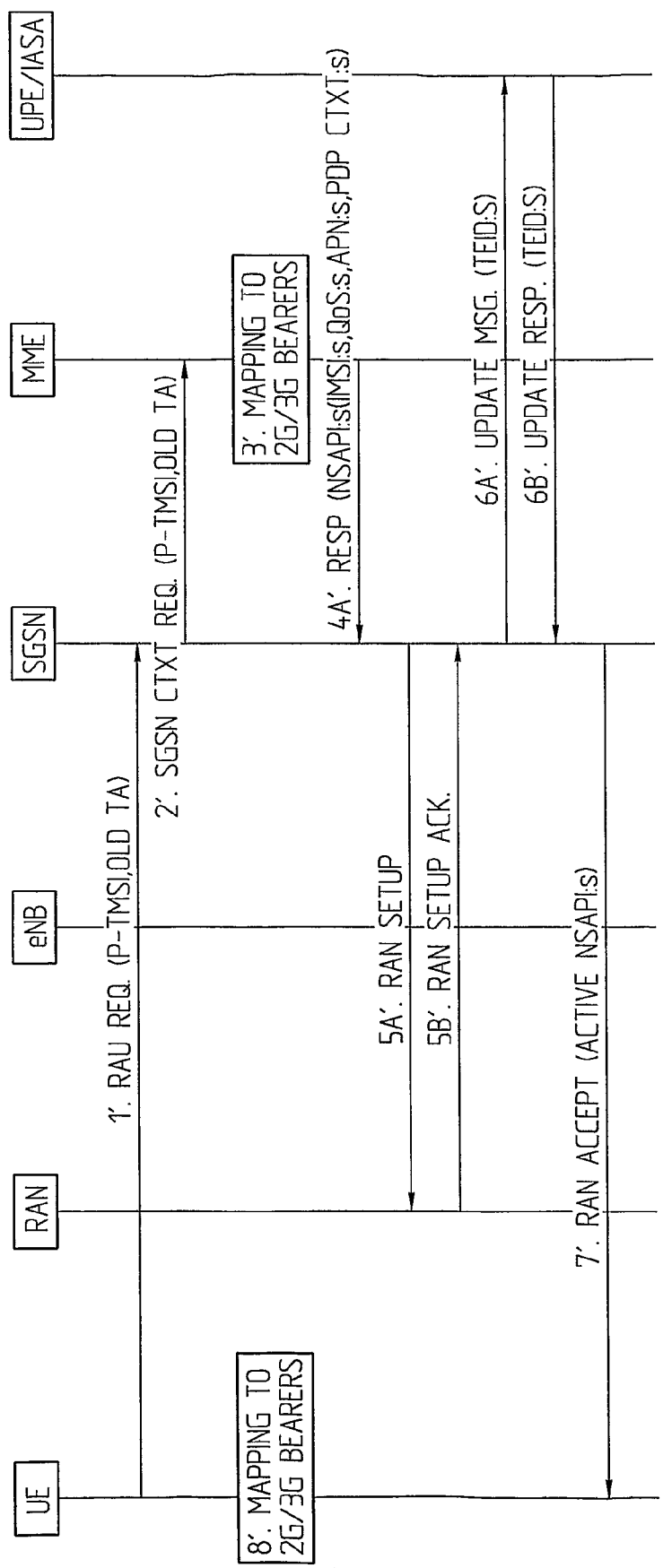
FIG. 13 is a sequence diagram illustrating an ISC from SAE/LTE to 2G/3G when the mapping function is provided in MME and UE respectively.

FIG. 13 is a sequence diagram describing one procedure according to the present invention for performing an ISC from SAE/LTE to 2G/3G wherein MME and UPE/IASA are implemented as separate entities. Thus it is supposed that the UE is attached to SAE/LTE and for some reason determines to do a handover to 2G/3G, for example due to a better radio coverage in the 2G/3G system or for any other appropriate reason.

The UE sends a RAU request to the new SGSN including P-TMSI and old TA (Tracking Area), 1'. Using the P-TMSI and old TA, SGSN is able to find the MME where the UE was attached in the SAE/LTE system and sends an SGSN context request to the MME to get the context for the UE, i.e. MM context and UE bearer contexts, 2'. MME then performs a mapping from SAE/LTE bearers to 2G/3G bearers, 3'. The new bearers are identified by the respective NSAPI:s corresponding to respective AB-id:s on the SAE/LTE side, 3'. MME sends information back to SGSN about the bearer contexts comprising NSAPI:s, and possibly one or more of e.g. IMSI:s, PDP contexts, QoS:s, UL filters, UPE addresses, 4'. SGSN then initiates a RAN setup for the concerned contexts, 5A', and RAN responds with a setup acknowledgement, 5B'. SGSN also sends an update bearer request to the UPE/IASA to setup tunnels for the bearers. If GTP is used for the S3 interface it may be PDP contexts and a GTP tunnel is set up. Some other protocol may however also be used. In case of OTS, the TEID:s indicate the tunnel end points in the RNC (Radio Network Controller), otherwise in the SGSN, 6A', and UPE/IASA responds with an update response message, 6B'. SGSN then sends a RAU accept message to the UE indicating the PDP context by giving the NSAPI:s that are active, 7'. UE performs or has already performed an internal mapping of the UE bearer contexts of the SAE/LTE system to corresponding PDP contexts (or 2G/3G bearers) according to the same predefined mapping function or mapping table as in the MME based on the predefined association between AB-ID:s and NSAPI:s as discussed above. This means that the UE can use the list of NSAPI:s received to establish which contexts that should be activated, 8'. It should be clear that neither in FIG. 12, nor in FIG. 13 the UE mapping has to be performed before receiving the RAU accept message; this procedure can be done in the UE before or at sending the first RAU request, at reception of the RAU accept or at any time therebetween.

In the following algorithms for mapping context and QCI/QoS between SAE/LTE and 2G/3G will be briefly discussed. For bearer mapping, particularly uplink, the UE has bearer contexts and UL filters installed. The UL filters indicate how SDF:s (Service Data Flow), are mapped to bearers. The SAE/LTE bearers are represented by UE bearer contexts and are identified by AB-ID:s, whereas 2G/3G bearers are represented by PDP contexts, identified by NSAPI:s. When a UE makes an ISC, for example from SAE/LTE to 2G/3G, it translates the UE bearer contexts to PDP contexts in a predefined manner (according to the mapping function), meaning that the UL filter is still used to map a certain SDF to a certain bearer that is known also by the network side. In that manner it is possible for the UE and the network to agree on which bearers that are used for specific SDF:s, and which are their attributes, without explicit signalling.

As far as DL bearer mapping is concerned, there may be special restrictions for handling and mapping TFT:s (Traffic Flow Templates) for the DL. In SAE/LTE QoS will be controlled by the network, which means that TFT:s for mapping DL packet flows onto bearers in the ACGW, are not known by the UE. When the UE moves from SAE/LTE to 2G/3G, where the QoS is UE controlled, the UE might try to send a modify PDP context to the network to update the bearer. However, since the TFT is not known by the UE since it originated from SAE/LTE access, it is not possible for the UE to modify it. This problem can according to the present invention be solved in different manners, although the inventive concept is not limited to solving the problem in any manner at all; it merely relates to different advantageous specific implementations.

According to a first solution, a message may be provided from ACGW to the UE in SAE/LTE to inform the UE about the TFT:s; TFT will be used only in the case of an ISC to a 2G/3G network. This information can be sent when a bearer is first activated. It may also be sent at any appropriate later stage.

According to an alternative solution, a restriction is simply introduced for the UE, such that it should not send any modified PDP context requests for a bearer that initially was setup in SAE/LTE, which deprives the UE from modifying bearers even if connected to 2G/3G. In still another implementation a new dedicated message may be introduced which is provided from the network to the UE in 2G/3G to inform the UE about TFT. The message is preferably only sent in case of an ISC to 2G/3G, e.g. as a GTP-C (GPRS Tunneling Protocol-Control Signalling) message.

It should be clear that the invention is not limited to the specifically illustrated embodiments, but that it can be varied in a number of ways within the scope of the appended claims. It is particularly not limited to be used for 2G/3G and SAE/LTE systems but it can likewise be implemented for any system where different bearer technologies are used, particularly for example between systems supporting only packet switched communication and systems supporting packet switched as well as circuit switched communication. Also in other respects the implementational details can be varied, different parameters etc. can be transmitted along with the respective messages etc., the main thing being that a mapping function is provided both in a mobile terminal and in a packet data core network node which mapping functions have the same information. Then the only information that is needed by the UE is information about the identities of the bearers which actually have been activated.

The invention claimed is:

1. A packet data core network node for supporting packet data communication, comprising:
   first communication means for control plane handling and mobility management;
   second communication means for user plane management;
   means for communication with dual mode mobile terminals over a first radio network; and,
   a mapping function for mapping between first radio bearers used in said first radio network and a first core network and second radio bearers of a type different from a type of said first radio bearers and used in a second radio network and a second core network, the mapping occurring at handover of ones of said dual mode mobile terminals between the first core network and the second core network, the mapping function comprising:
   a first repository for holding first bearer mapping rules for mapping system architecture evolution/long term evolution, SAE/LTE, labels onto 2G/3G traffic classes; and,
   a second repository for holding second bearer mapping rules for mapping 2G/3G traffic classes onto SAE/LTE labels.

2. The packet data core network node according to claim 1, wherein the first communication means are adapted to activate the mapping function, at reception of a control message requesting said first radio bearers from a second core network node via the second communication means, to map said first radio bearers used in the first core network to said second radio bearers used in the second core network, the mapping function using information in said first and second repositories.

3. The packet data core network node according to claim 2, wherein the first communication means are adapted to:
   provide information in the form of second radio bearer identities in a response message relating to mapped second radio bearers that have been activated; and,
   via the second communication means, activate the mapping function for mapping said first radio bearers onto said second radio bearers for performing a network initiated intersystem change.

4. The packet data core network node according to claim 1, the packet core data network node being a packet-only core network node in an Evolved Packet Core (EPC) adapted to operate in a system architecture evolution/long term evolution, SAE/LTE, network and comprising:
   a mobility management entity arranged separate from one of a user plane entity, a combined mobility management and user plane entity (MME/UPE) node, a wide local area network, WLAN, core network node, and a WiMAX core network node, said packet-only core network node supporting communication of packet data only.

5. The packet data core network node according to claim 1, wherein the mapping function is arranged external to, but in communication with, said packet data core network node.

6. The packet data core network node according to claim 4, wherein the first communication means are adapted to:
   generate and send a message comprising information about traffic flow mapping onto a radio bearer at reception of a mobile terminal originating request for handover from the packet-only core network node; and,
   generate and send a restriction message to a mobile terminal for restricting the mobile terminal from sending modify PDP context requests for radio bearers initially set up in the packet-only core network node.

7. The packet data core network node according to claim 1, the packet data core network being a packet data support node of a 2G/3G network.

8. The packet data core network node according to claim 7, wherein the packet data core network node is adapted to activate the mapping function at reception of a routing area update request comprising an intersystem change from a mobile terminal.

9. The packet data core network node according to claim 1, wherein the mapping function further comprises a predefined mapping table.

10. The packet data core network node according to claim 1, wherein the 2G/3G traffic classes include conversational, interactive, streaming and background.

11. A dual mode mobile terminal supporting communication over a first radio network with at least a first core network node and with at least a second core network node over a second radio network, the dual mode mobile terminal comprising a mapping function, the mapping function comprising a first repository holding first mapping rules for mapping system architecture evolution/long term evolution, SAE/LTE, labels onto 2G/3G traffic classes, and a second repository holding second mapping 2G/3G traffic classes onto SAE/LTE labels.

12. The dual mode mobile terminal according to claim 11, further adapted to:
   activate the mapping function at handover between said first core network and said second core network;
   detect initiation of a network initiated handover between said first core network and said second core network at reception of a message from a core network node; and,
   activate the mapping function to perform a corresponding radio bearer mapping.

13. The mobile terminal according to claim 11, wherein the mapping rules are predefined.

14. A method for performing a handover for a dual mobile terminal supporting communication with a first packet data core network node in a first core network and with a second core network node in a second core network, said first and second core networks implementing first and second radio bearers respectively which are of different types, the method comprising the steps of:
   establishing in one of the first and second core network nodes that a handover is to be performed between the first core network and the second core network;
   activating a mapping function provided in the one of the first and second core network node having made the establishment;
   performing a mapping of radio bearers used in the one of the first and second core network from which the handover is to be performed to radio bearers in the one of the second and first core network to which the handover is to be performed, the mapping being according to one of a first set of rules stored in a first repository for mapping system architecture evolution/long term evolution, SAE/LTE, labels onto 2G/3G traffic classes and a second set of rules stored in a second repository for mapping 2G/3G traffic classes onto SAE/LTE labels;

identifying in the one of the first and second core network node to which a handover is to be performed, which of the mapped radio bearers that are activated;

providing the one of the first and second core network node from which a handover is to be performed, and the mobile terminal, with information abet the identities of the activated radio bearers; and, completing the handover and using the mapped radio bearers.

15. The method according to claim 14, wherein the step of establishing comprises:

receiving, in said first core network node comprising an evolved packet core, EPC, node handling control signaling, a radio bearer request, the radio bearer request comprising a packet data protocol, PDP, context request, from a second core network node comprising a serving general packet radio support node, SGSN; and, responsive to receiving the radio bearer request, initiating a handover in the first core network node.

16. The method according to claim 14, wherein, for a handover from the first core network node comprising an EPC node to the second core network node comprising a serving general packet radio support node, SGSN, the method further comprises the steps of:

mapping, in the mapping step, said first radio bearers onto said second radio bearers;

providing a response message from the first core network node to the second core network node with information relating to active second core network radio bearers; and, providing an updating response message from the second core network node to the mobile terminal including information about active radio bearers.

17. The method according to claim 16, wherein the mapping of SAE/LTE labels onto 2G/3G traffic classes is based on at least one high level characteristic, a high level characteristic being one of realtime priorities, non-realtime priorities and Diffserv Code Point.

* * * * *

UNITED STATES PATENT AND TRADEMARK OFFICE
CERTIFICATE OF CORRECTION

Page 1 of 1

PATENT NO. : 8,917,698 B2
APPLICATION NO. : 12/377974
DATED : December 23, 2014
INVENTOR(S) : Lundin et al.

It is certified that error appears in the above-identified patent and that said Letters Patent is hereby corrected as shown below:

In the specification,

In Column 3, Line 45, delete "envolved" and insert -- evolved --, therefor.

In Column 6, Line 57, delete "first ans" and insert -- first and --, therefor.

In Column 10, Line 58, delete "avare" and insert -- aware --, therefor.

In Column 10, Line 60, delete "obselete" and insert -- obsolete --, therefor.

In the claims,

In Column 15, Line 8, in Claim 14, delete "abet" and insert -- about --, therefor.

Signed and Sealed this
Twenty-seventh Day of October, 2015

Michelle K. Lee
*Director of the United States Patent and Trademark Office*